US010655667B2

(12) United States Patent
Stevens et al.

(10) Patent No.: US 10,655,667 B2
(45) Date of Patent: May 19, 2020

(54) RAPID INSTALLATION THERMOPLASTIC EME PROTECTION CAP

(71) Applicant: THE BOEING COMPANY, Chicago, IL (US)

(72) Inventors: Bart Stevens, Summerville, SC (US); Brandon Mulligan, Charleston, SC (US); Brandon D. Booth, Mount Pleasant, SC (US); Daniel J. Cowan, North Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 111 days.

(21) Appl. No.: 15/718,618

(22) Filed: Sep. 28, 2017

(65) Prior Publication Data
US 2019/0093696 A1    Mar. 28, 2019

(51) Int. Cl.
*F16B 37/14*     (2006.01)
*B64D 45/02*     (2006.01)
(Continued)

(52) U.S. Cl.
CPC ............. *F16B 37/14* (2013.01); *B64D 45/02* (2013.01); *F16B 33/004* (2013.01); *F16B 39/225* (2013.01)

(58) Field of Classification Search
CPC ............. F16B 23/0007; F16B 23/0061; F16B 23/0069; F16B 23/0076; F16B 33/004;
(Continued)

(56) References Cited

U.S. PATENT DOCUMENTS 1,368,637 A * 2/1921 McFarland ............. F16B 39/02
411/315
3,699,368 A 10/1972 Palmer
(Continued)

FOREIGN PATENT DOCUMENTS

CA    2856687 A1    3/2015
CA    2858461 A1    3/2015
(Continued)

OTHER PUBLICATIONS

Extended European Search Report for EP Application No. 18196707.6 dated Feb. 19, 2019.
(Continued)

*Primary Examiner* — Roberta S Delisle
(74) *Attorney, Agent, or Firm* — Marshall, Gerstein & Borun LLP

(57) ABSTRACT

A cap assembly for enclosing an end portion of a bolt fastener includes a first cap member which includes a bore and a surface positioned within the bore which defines first threads and the first cap member also includes an external surface which defines second threads. A second cap member includes a sidewall which defines a receptacle with an opening which provides access to an interior of the receptacle and the sidewall includes an interior surface which defines third threads compatibly configured to engage the second threads. The third threads are positioned along the interior surface of the receptacle extending along a length of the receptacle a first distance and the second threads are positioned along the external surface of the first cap member extending along a length of the external surface a second distance wherein the first distance is greater than the second distance.

20 Claims, 12 Drawing Sheets

(51) Int. Cl.
  *F16B 39/22* (2006.01)
  *F16B 33/00* (2006.01)

(58) Field of Classification Search
  CPC ...... F16B 37/14; F16B 39/225; F16B 41/005; Y10S 411/91
  USPC ........... 411/372.5, 372.6, 373–374, 429, 431
  See application file for complete search history.

(56) References Cited

U.S. PATENT DOCUMENTS

| | | | |
|---|---|---|---|
| 4,013,190 A | | 3/1977 | Wiggins et al. |
| 4,295,766 A | | 10/1981 | Shaw |
| 4,519,974 A | | 5/1985 | Bravenec et al. |
| 4,630,168 A | | 12/1986 | Hunt |
| 4,636,446 A | | 1/1987 | Lee |
| 4,826,380 A | | 5/1989 | Henry |
| 4,850,778 A | * | 7/1989 | Clough ............... F16B 37/0842 411/433 |
| 4,884,933 A | * | 12/1989 | Preusker ................ B60C 27/04 411/177 |
| 5,108,853 A | | 4/1992 | Feres |
| 5,350,266 A | | 9/1994 | Espey et al. |
| 5,752,794 A | * | 5/1998 | Krawczak ................ B60B 7/14 301/108.4 |
| 6,053,683 A | * | 4/2000 | Cabiran ................. F16B 37/14 411/372.6 |
| 6,102,128 A | | 8/2000 | Bridgeman |
| 6,318,942 B1 | * | 11/2001 | Wieczorek ............. F16B 37/14 411/374 |
| 7,134,666 B2 | | 11/2006 | Beyssac et al. |
| 7,755,876 B2 | | 7/2010 | Morrill et al. |
| 7,918,081 B2 | | 4/2011 | Schlichting et al. |
| 7,936,550 B2 | | 5/2011 | Morrill et al. |
| 8,318,942 B2 | | 11/2012 | Zhang |
| 8,388,293 B2 | * | 3/2013 | Hutter, III ............... F16B 37/14 411/377 |
| 8,711,541 B2 | | 4/2014 | Umemoto et al. |
| 8,717,735 B2 | | 5/2014 | Day et al. |
| 8,717,736 B2 | | 5/2014 | Asahara et al. |
| 8,840,740 B2 | | 9/2014 | Rorabaugh et al. |
| 8,894,338 B2 | | 11/2014 | Dobbin et al. |
| 9,133,874 B2 | * | 9/2015 | Hill ......................... F16B 35/00 |
| 9,188,226 B2 | | 11/2015 | Pajel et al. |
| 9,228,604 B2 | | 1/2016 | Dobbin |
| 10,151,337 B2 | * | 12/2018 | Hill .......................... F16B 21/00 |
| 2002/0192052 A1 | * | 12/2002 | Ruspa ..................... F16B 37/14 411/431 |
| 2008/0137259 A1 | | 6/2008 | Heeter et al. |
| 2009/0194297 A1 | | 8/2009 | Ortiz Teruel |
| 2010/0303582 A1 | * | 12/2010 | Choi ..................... B62D 25/147 411/366.1 |
| 2012/0217673 A1 | | 8/2012 | Hutter, III |
| 2013/0206759 A1 | | 8/2013 | Wurz et al. |
| 2013/0223951 A1 | | 8/2013 | Bessho et al. |
| 2014/0048198 A1 | | 2/2014 | Dobbin et al. |
| 2014/0261956 A1 | | 9/2014 | Wiseman et al. |
| 2014/0341675 A1 | | 11/2014 | Dobbin |
| 2015/0060465 A1 | | 3/2015 | Limbacher et al. |
| 2015/0082603 A1 | | 3/2015 | Rawdon et al. |
| 2015/0086295 A1 | | 3/2015 | Cameron et al. |
| 2015/0184688 A1 | | 7/2015 | Dobbin et al. |
| 2015/0345533 A1 | * | 12/2015 | Hill ......................... F16B 35/00 411/374 |
| 2016/0131179 A1 | | 5/2016 | Prouty et al. |
| 2017/0021209 A1 | | 1/2017 | Damazo et al. |

FOREIGN PATENT DOCUMENTS

| | | |
|---|---|---|
| DE | 1085586 B | 7/1960 |
| EP | 2610506 A1 | 7/2013 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| GB | 612381 A | 11/1948 |
| JP | H02102910 A | 4/1990 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| RU | 2014128760 A | 2/2016 |
| WO | WO-9729289 A1 | 8/1997 |
| WO | WO-0057069 A1 | 9/2000 |
| WO | WO-2009063063 A1 | 5/2009 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

Novaria/ESNA Design, dated Jul. 14, 2017 3 pgs (Under Seal).
Drawings of Boeing Part Standard, BACC50AP, dated Feb. 2, 2017, 2 pgs.
Photographs of Boeing Proprietary, Zap Cap Further Screening Test Plan for 787 Fuel Tank Use, Mar. 24, 2016, 1 pg.
EP Search Report for Application No. EP14175808 dated Mar. 6, 2015.
PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "POREX(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/POREX-Battery-Vents--Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
http://www.porex.com/files/documents/Porex-Battery-Vents-Letter---English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340, filed Apr. 27, 2018.
Bart Stevens et al., U.S. Appl. No. 15/718,618, filed Sep. 28, 2017.
Sean Auffinger et al., U.S. Appl. No. 16/046,316, filed Jul. 26, 2018.
Bart Stevens et al., U.S. Appl. No. 15/960,835, filed Apr. 24, 2018.
Toulouse, Mixed Metal-Composite Assembly, May 2013.
Boeing Proprietary, Zap Caps as Alternative to Seal Caps—Task No. 17728-01, dated Aug. 19, 2016, 30 pages.
Boeing Proprietary, Zap Cap Further Screening Test Plan for 787 Fuel Tank Use, Mar. 24, 2016, 24 pages.
Hutchinson Proprietary Document, Accessories: TP Nutcaps, 1 page.

(56) References Cited

OTHER PUBLICATIONS

Novaria/ESNA Design, dated Jul. 14, 2017, 3 pgs.
Boeing Part Standard, BACC50AP, dated Feb. 2, 2017, 16 pgs.
Click Bond Cap dated May 16, 2016, 4 pgs.
Office Action for RU Application No. 2018127328/07 dated May 20, 2019.
EP Search Report for EP Application No. 19167831.7 dated Aug. 29, 2019.
EP Search Report for Application No. EP19166688 dated Aug. 29, 2019.
EP Office Action for Application No. 19166688.2 dated Sep. 20, 2019.
European Search Report for Application No. 19179944.4 dated Sep. 10, 2019.
Communication Pursuant to Article 94(3) dated Oct. 16, 2019.
Extended EP Search Report for EP Application No. 19207962.2 dated Mar. 26, 2020.
Extended EP Search Report for EP Application No. 19204019.4 dated Mar. 30, 2020.
Written Opinion for EP Application No. 19204019.4 dated Mar. 30, 2020.

\* cited by examiner

RAPID INSTALLATION THERMOPLASTIC EME PROTECTION CAP

FIELD

This disclosure relates to electrical insulation and containment caps to be positioned on metallic fasteners to electrically insulate the fastener from transmission of current or sparks into the vicinity of the fastener upon the occurrence of an electromagnetic effect (EME)/lightning strike event and more particularly for electrical insulation and containment caps covering a threaded fastener.

BACKGROUND

Electrically insulated sealant and containment caps have been used to cover an end portion of a metallic bolt assembly which typically includes one or more washer(s), a nut and a threaded end portion of a bolt shaft which extends beyond the nut. The sealant caps electrically insulate the end portion of the metallic bolt assembly so as electrically isolate and contain the end portion from important vicinities surrounding the end portion of the metallic bolt assembly such as a fuel tank within an aircraft. Electrically isolating and containing the end portion of the metallic bolt assembly prevents unwanted sparks or electrical current transmissions entering such important vicinities upon an EME/lightning event.

The insulation and containment caps are made from sealant material such as for example a thermoset plastic. The caps are also filled with a liquid form of sealant material. Once the cap is filled with liquid sealant the cap is positioned over the end portion of the metallic bolt assembly enclosing the end portion of the metallic bolt assembly within the cap and a surface from which the end portion of the metallic bolt assembly extends. The liquid sealant that is expelled from the cap from placing the cap over the end portion of the metallic bolt assembly requires fairing. The cap also requires being held in place for a time period to maintain the cap's position so as to prevent occurrence of the cap experiencing slumping or lifting off of the surface and the end portion of the metallic bolt assembly during the curing of the sealant. The quality standards for fairing these caps are high which makes installation time consuming and places the installation at high risk of failing quality checks resulting in increased rework.

Other sealant insulating and containment caps have been used such as a single piece cap with an internal threading portion to engage the exposed threads of the threaded portion of the threaded shaft of the metallic bolt assembly which extends beyond the nut of the end portion of the metallic bolt assembly. The single piece cap has limited ability to accommodate properly engaging the threaded bolt shaft and the cap being able to extend to the surface in order to enclose the end portion of the metallic bolt assembly. With the threads of the cap needing to engage one up to and including three threads of the threaded bolt shaft positioned beyond the nut to be properly engage, the distance from the engaged threads of the bolt shaft to the surface varies based on how far, for example, the threaded shaft of the metallic bolt assembly extends from the surface. This distance can also vary based on the size of the nut and/or number of washers positioned on the threaded shaft of the bolt. Thus, with a fixed length of sealant cap, many variations in lengths of these sealant caps would be needed in assembling a complex structure such as an aircraft which would present varying lengths of end portions of the metallic bolt assemblies extending from the surface from which the end portions originate. These variations in lengths of the sealant caps would be needed to enclose and electrically isolate the end portions of the metallic bolt assemblies from sensitive areas within the aircraft.

There is a need for a cap that is not dependent on liquid sealant which drives high installation costs with the high standards placed on fairing for these installations. There is also a need for a sealant cap that can accommodate varying distances from the engagement of the threads of the shaft of the metallic bolt assembly to the surface from which the end portion of the metallic bolt assembly extends. Accommodating these varying distances are needed to properly electrically isolate the end portion of the metallic bolt assemblies but at the same time not driving up cost of installation with needing a large number of different lengths of caps on hand.

SUMMARY

An example includes a cap assembly for enclosing an end portion of a metallic bolt assembly which includes a first cap member which includes a bore which extends through at least a portion of the first cap member and a surface of the first cap member positioned within the bore defines first threads and an external surface defines second threads. Also included is a second cap member which includes a sidewall which defines a receptacle with an opening which provides access for the first cap member to be positioned within an interior of the receptacle and the sidewall of the receptacle includes an interior surface which defines third threads compatibly configured to engage the second threads of the external surface of the first cap member. The third threads are positioned along a length of the interior surface of the receptacle extending a first distance and the second threads are positioned along a length of the external surface of the first cap member extending a second distance. The first distance is greater than the second distance.

An example includes a cap assembly for enclosing an end portion of a metallic bolt assembly which includes a first cap member which includes a bore which extends through at least a portion of the first cap member and a surface of the first cap member within the bore defines first threads. An external surface defines first teeth which extend in a direction away from the first cap member and are positioned to extend along a length of the external surface. Also included is a second cap member which includes a sidewall which defines a receptacle with an opening which provides access for the first cap member to be positioned within an interior of the receptacle. The sidewall of the receptacle includes an interior surface which defines second teeth which extend in a direction away from the sidewall toward the interior of the receptacle and are positioned to extend along a length of the interior surface. The second teeth extend along the length of the interior surface of the receptacle a first distance and the first teeth extend along the length of the external surface of the first cap member a second distance. The first distance is greater than the second distance.

The features, functions, and advantages that have been discussed can be achieved independently in various embodiments or may be combined in yet other embodiments further details of which can be seen with reference to the following description and drawings.

DESCRIPTION

Figure 1:
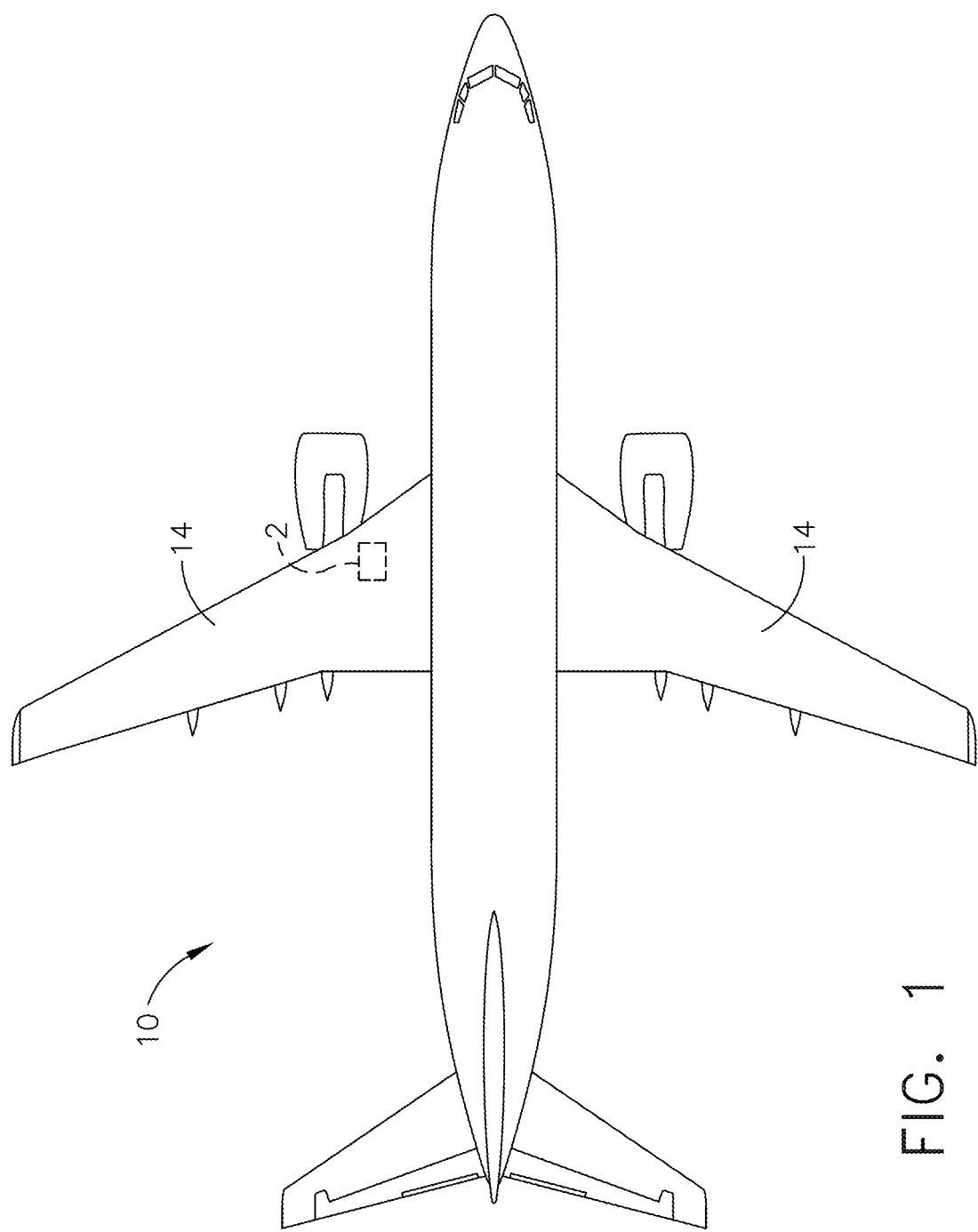
FIG. 1 a top plan view of an aircraft designating an example location within the aircraft for use of a protective cap assembly for a metallic bolt assembly to protect the vicinity within the aircraft from an electromagnetic effect/lightning strike event.
Figure 2:
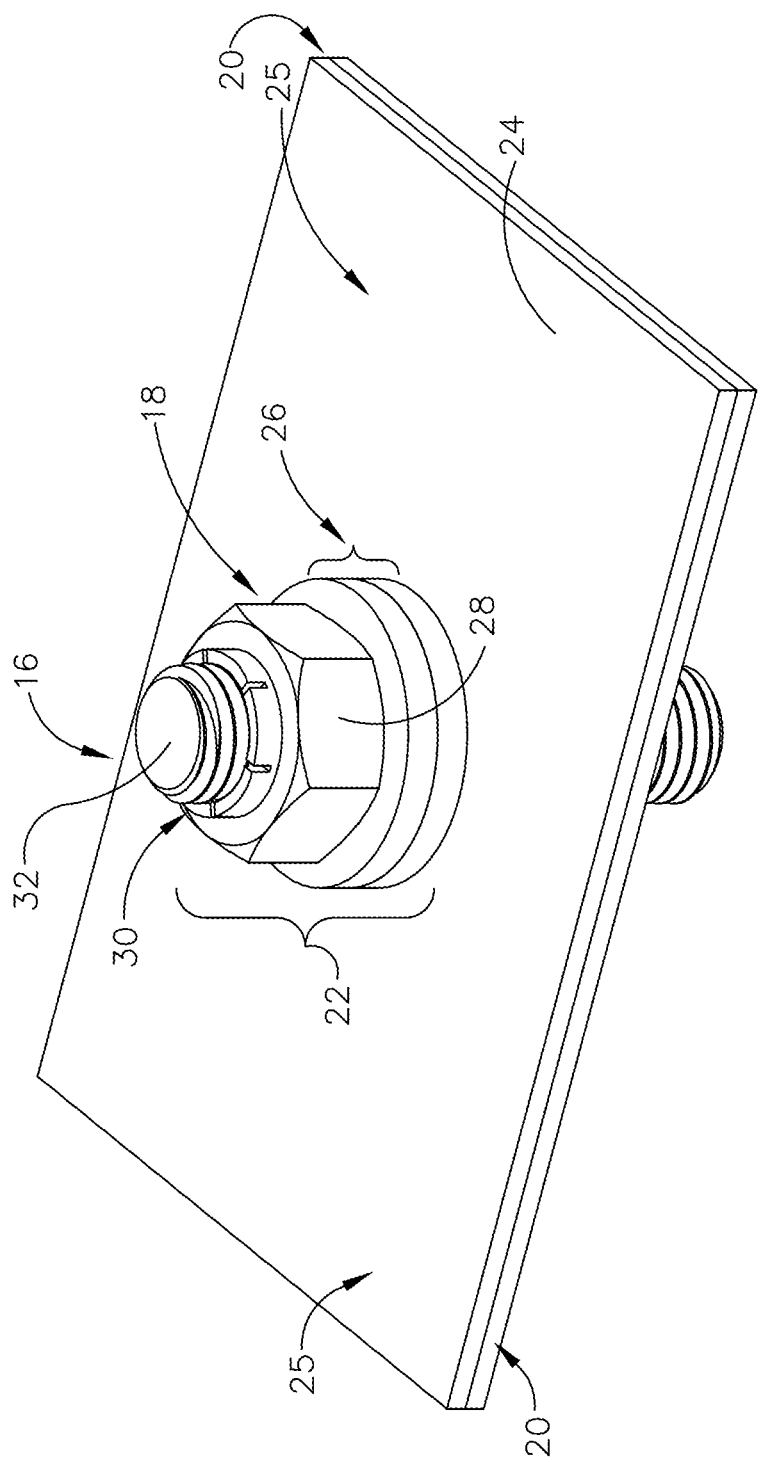
FIG. 2 is a partial perspective view of a metallic bolt fastener assembly secured to a structural assembly located within the aircraft at location designated as 2 in FIG. 1.

In referring to FIG. 1, aircraft 10 is shown wherein a portion of aircraft 10 designated as 2 is shown positioned at wing 14 as an example position in which a fastener is utilized and positioned within wing 14. This example includes the fastener being positioned in the vicinity of a fuel tank (not shown) within wing 14. Fuel tank locations can be, for example, also found in a center wing box location and auxiliary fuel tanks can be found in other locations within aircraft 10. Fastener 16, as seen in FIG. 2, includes metallic bolt assembly 18 as an example of a configuration of fastener 16 employed for fastening structural components 20 within aircraft 10. Metallic bolt assembly 18 includes end portion 22 positioned extending from surface 24 of side 25 of structural components 20. End portion 22 in this example includes one or more washers 26, nut 28, threaded shaft 32 and threaded portion 30 of threaded shaft 32 of metallic bolt assembly 18 which extends from nut 28.

In the interest of protecting fuel tanks and other important vicinities in which metallic fasteners 16 are present within aircraft 10 from an electromagnetic effect ("EME") or lightning strike event, end portions 22 of metallic bolt assembly 18 for example are electrically isolated from the fuel tanks and other important vicinities within aircraft 10. To electrically isolate end portion 22 of metallic bolt assembly 18, end portion 22 is enclosed within nonconductive material and surface 24 of side 25 from which end portion 22 of metallic bolt assembly 18 extends from structural components 20 being secured. With electrically isolating end portion 22 of metallic bolt assembly 18, electrical conduction or sparks are prevented from emanating from end portion 22 of metallic bolt assembly 18 as a result of an EME or lightning strike event into the vicinity within aircraft 10 in which end portion 22 is located.

Figure 5:
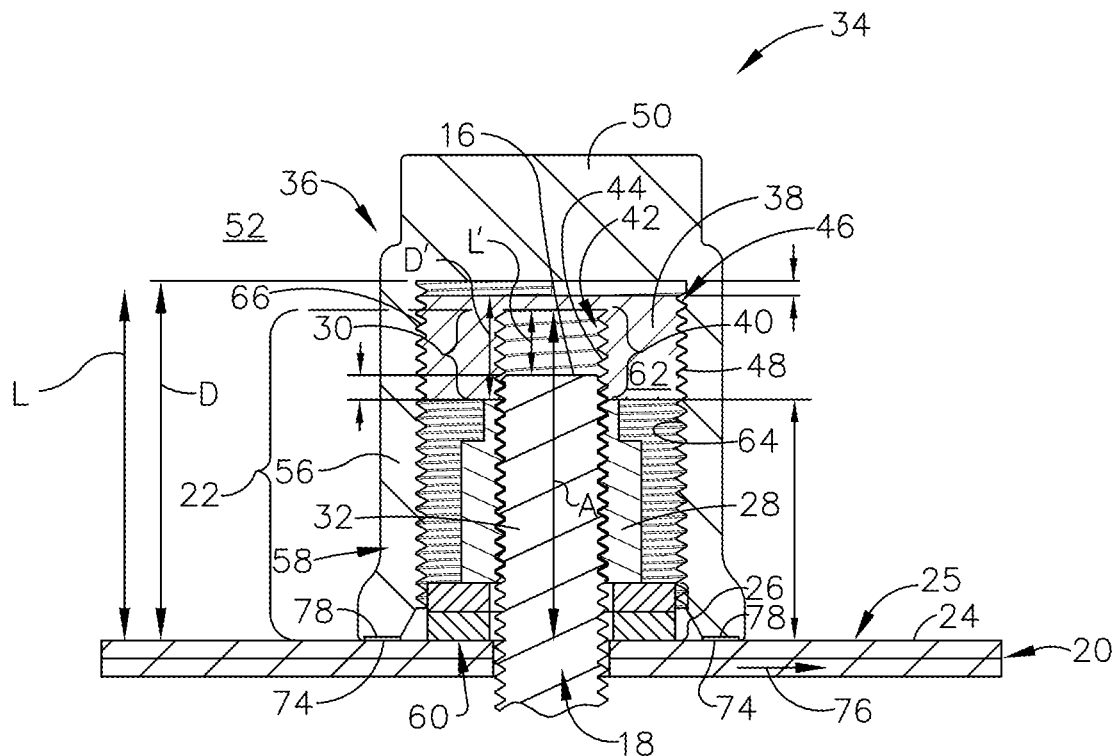
FIG. 5 is a cross section view of the first embodiment of the assembled cap assembly secured to an end portion of the metallic bolt fastener of FIG. 3 as seen along line 5-5.
Figure 6:
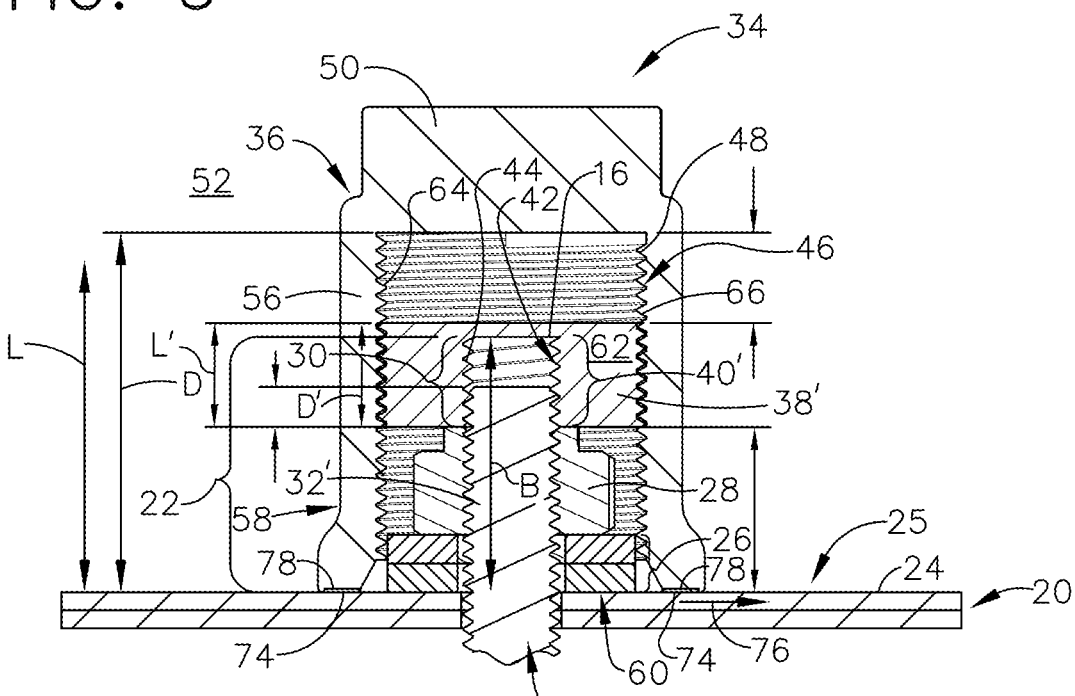
FIG. 6 is the cross section view of FIG. 5 wherein the first embodiment of the cap assembly is secured to the end portion of the metallic bolt assembly with the diameter of the threaded shaft having a smaller diameter and with the end portion of the metallic bolt assembly extending a lesser distance from a surface of the structural assembly being secured than what is shown in FIG. 5.

In referring to FIGS. 3-6, a first embodiment 34 of cap assembly 36 for electrically isolating end portion 22 of metallic bolt assembly 18 or 18' is shown. Cap assembly 36, as will be discussed, is used to enclose end portion 22 of metallic bolt assembly 18, as seen in FIGS. 2-5, within cap assembly 36 wherein cap assembly 36 is positioned over end portion 22 and sealed against, in this example, surface 24. First cap member 38 includes bore 40 which extends through at least a portion of first cap member 38 and surface 42 of first cap member 38 positioned within bore 40 defines first threads 44 wherein diameter of bore 40 and first threads 44 accommodate a diameter of threaded shaft 32. External surface 46 of first cap member 38 defines second threads 48. In FIG. 6, first cap member 38' includes bore 40' which extends through at least a portion of first cap member 38', wherein bore 40' has a smaller diameter than diameter of bore 40 and first threads 44 accommodate a smaller diameter of threaded shaft 32' of metallic bolt assembly 18'. At the same time, both first cap members 38, as seen in FIG. 5, and first cap member 38', as seen in FIG. 6, both have external surface 46 which defines second threads 48 and both compatibly engage third threads 66 of second cap 50, as seen in FIGS. 5 and 6. These configurations of first cap members 38 and 38' each have different bore sizes of bore 40 and bore 40' respectively and each have the same external size and configuration. This arrangement permits the utilization of same second cap member 50 regardless of the change in diameter of threaded shafts 32 or 32' being present. Further versatility of cap assembly 36 will be discussed below with respect to second cap member 50 accommodating different lengths of end portions 22 of metallic bolt assemblies 18 and 18' extending from surface 24.

In the present examples, first cap member 38 or 38' is constructed of one of a thermoplastic, thermoset or metallic material. Other nonconductive materials can be employed and other conductive materials can also be employed since first cap member 38 or 38' will be enclosed within second cap member 50 and will not be exposed to environment 52 in the vicinity of metallic bolt assembly 18 or 18'. In addition, in this example, first cap member 38 includes a pair of wrench flats 54, as seen for example for first cap member 38 in FIG. 4, positioned on external surface 46 of first cap member 38. This configuration for first cap member 38 is similar to that of first cap member 38' (not shown). One of the wrench flats of the pair of wrench flats 54 is positioned spaced apart from another of the wrench flats of the pair of wrench flats 54 along external surface 46 of first cap member 38 with second threads 48 positioned and extending between pair of wrench flats 54. Any number of spaced apart wrench flats can be employed on external surface 46 so as to provide the installer ease of application of torque to first cap member 38 during installation. However, at the same time positioning and number of wrench flats should not be employed so as not to compromise the integrity of the use of second threads 48 positioned on external surface 46 of first cap member 38. The arrangement with respect to wrench flats 54 with respect to first cap member 38, as discussed above, applies to that of first cap member 38' as well and is not shown.

In installing first cap member 38, of FIGS. 2-5, first threads 44 of first cap member 38 engage threaded portion 30 of threaded shaft 32 of metallic bolt assembly 18. First threads 44 engage in a range of one thread up to and including three threads of the threaded portion 30 of threaded shaft 32 of metallic bolt assembly 18. With first cap member 38 secured to threaded portion 30, in this example, first cap member 38 abuts nut 28 positioned on threaded portion 30 of threaded shaft 32 of metallic bolt assembly 18. Similarly, in installing first cap member 38' of FIG. 6, first threads 44 of first cap member 38' engage threaded portion 30 of threaded shaft 32' of metallic bolt assembly 18'. First threads 44 engage, as stated above, in a range of one thread up to and including three threads of threaded portion 30 of threaded shaft 32' of metallic bolt assembly 18'. With first cap member 38' secured to threaded portion 30, in this example, first cap member 38' abuts nut 28 positioned on threaded portion 30 of threaded shaft 32' of metallic bolt assembly 18'.

In referring to FIGS. 3-6 second cap member 50 includes sidewall 56, as seen in FIGS. 5 and 6, which defines receptacle 58 with opening 60 providing access for first cap member 38 to be positioned within interior 62 of receptacle 58. Sidewall 56 of receptacle 58 includes interior surface 64 which defines third threads 66 compatibly configured to engage second threads 48 of external surface 46 of first cap member 38. Third threads 66 are positioned along length L of interior surface 64 of receptacle 58 extending first distance D. Second threads 48 are positioned along length L' of external surface 46 of first cap member 38 extending second distance D'. First distance D is greater than second distance D'.

This greater distance of first distance D of third threads 66 allows second threads 48 of external surface 46 of first cap member 38 to travel along third threads 66 so as to adjust to differing distances in which end portions 22 of different metallic bolt assemblies may extend from surface 24 of structural components 20 such that second cap member 50 encloses end portion 22 of metallic bolt assembly 18 with reaching surface 24. This versatility of cap assembly 36, for example, can be seen in FIGS. 5 and 6. In FIG. 5, end portion 22 of metallic bolt assembly 18 extends to altitude A above surface 24 which is higher than end portion 22 of metallic bolt assembly 18' in FIG. 6 which extends to a lower altitude B above surface 24. Thus in FIG. 5, with first cap member 38 secured to threaded portion 30, first cap member 38 with second threads 48 travels sufficiently high enough within receptacle 58 along third threads 66 such that receptacle 58 reaches surface 24. In FIG. 6, with first cap member 38' secured to threaded portion 30, first cap member 38' with second threads 48 travels along third threads 66 a lesser distance within receptacle 58 until receptacle 58 reaches surface 24. As seen in FIGS. 5 and 6, based on the ability of second threads 48 being able to travel along third threads 66 until sidewall 56 of receptacle 58 reaches surface 24, end portions 22 of metallic bolt assembly 18 or 18' in FIG. 5 or 6 respectively, which extend to different altitudes from surface 24, can be enclosed within cap assembly 36 with sidewalls 56 of receptacle 58 extending to surface 24. This versatility provided by the difference in distance D of third threads 66 extending along length L of interior surface 64 of receptacle 58 being greater than distance D' of second threads 48 extending along length L' of external surface 46 for second threads 48, provides second cap 50 of cap assembly 36 the ability to securely enclose various lengths of end portions 22 extending from surface 24 and reduces the number of different sized receptacles 58 needed in fabricating a complex structure such as aircraft 10.

Figure 3:
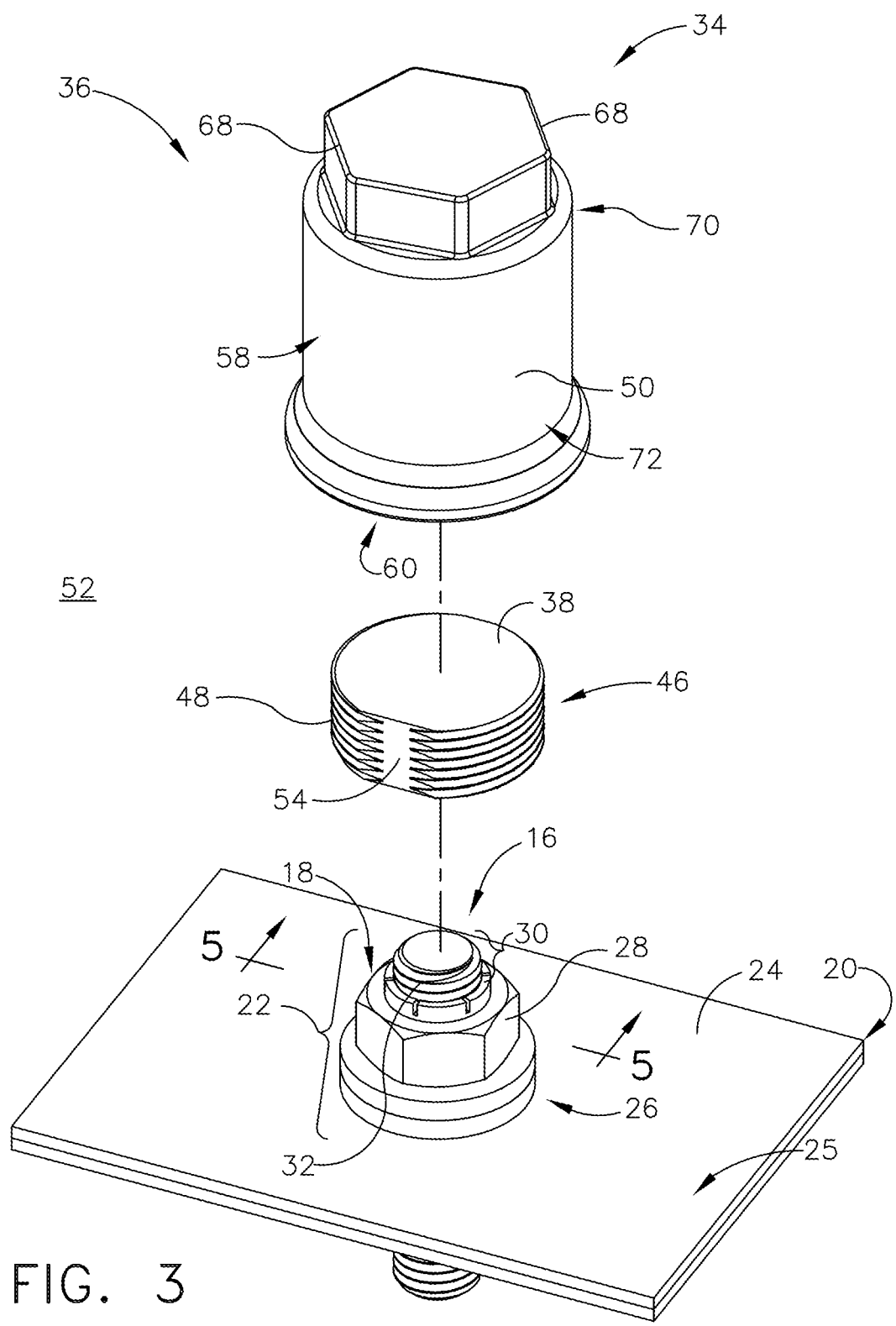
FIG. 3 is an exploded view of a first embodiment of a cap assembly for providing EME/lightning strike event protection with respect to an end portion of the metallic bolt fastener assembly as seen in FIG. 2.
Figure 4:
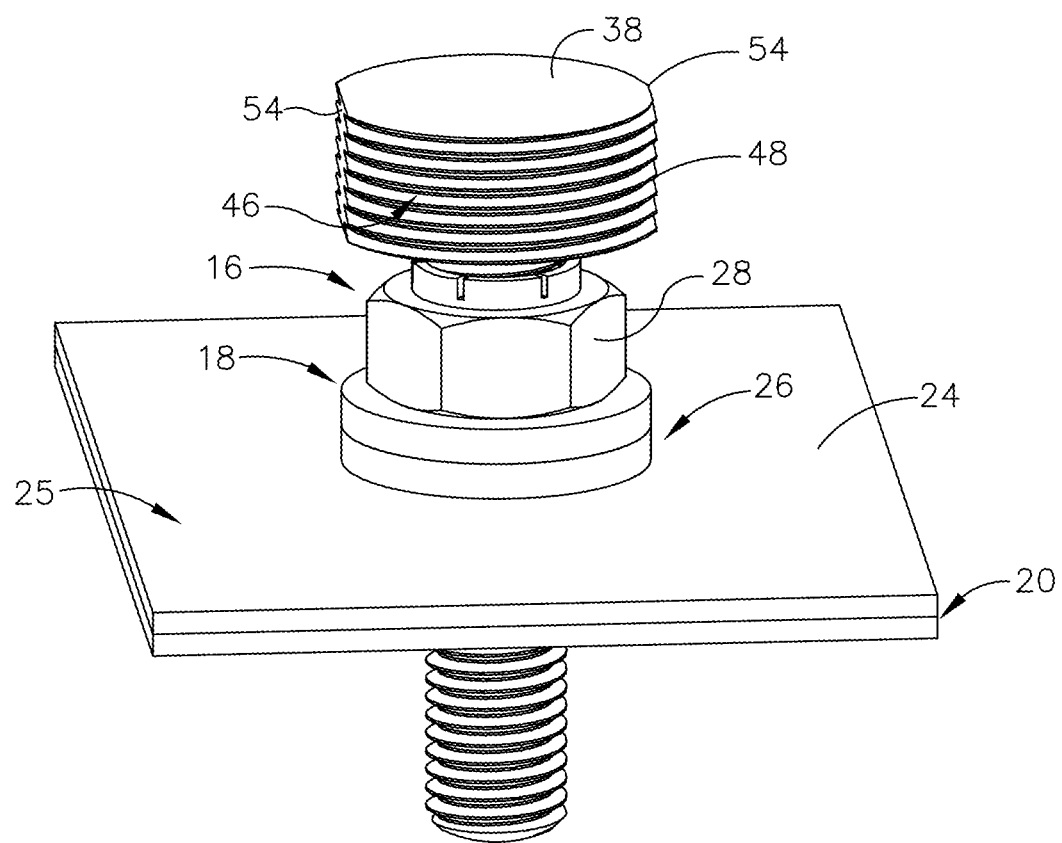
FIG. 4 is a perspective view of a first cap member of the first embodiment of the cap assembly of FIG. 3 secured to a threaded portion of a threaded shaft which extends from a nut of the metallic bolt assembly.

Second cap member 50 is constructed of various select compositions such as thermoplastic or thermoset materials. In these examples, the composition(s) is non-conductive which facilitates the electrical isolation of end portion 22 of metallic bolt assembly 18 or 18'. Second cap member 50 includes a pair of wrench flats 68 as seen in FIG. 3 positioned spaced apart from one another along external surface 70 of second cap member 50. Any number of wrench flats can be applied to second cap member 50 so as to facilitate the application of torque to second cap member 50.

As seen in FIG. 3, a portion of external surface 70 of receptacle 58 includes cylindrical shape 72 which includes end surface 74, as seen in FIGS. 5 and 6. End surface 74 extends about receptacle 58 and extends in direction 76 in an angular direction relative to length L of interior surface 64 of receptacle 58. In this example, the direction 76 and length L are transverse to one another. Based on the need at the particular location, one of a sealant or adhesive 78, can be positioned on end surface 74. An example of a sealant can include a polysulfide or other commonly known sealants and an example of an adhesive can include an epoxy or other commonly known adhesives. With second cap member 50 tightened down onto surface 24, end surface 74 abuts against surface 24 with sealant or adhesive 78, in this example, positioned between end surface 74 and surface 24. Sealant or adhesive 78 provides further electrical isolation and containment of end portion 22 of metallic bolt assembly from environment 52 of the vicinity of the location of fastener 16.

Figure 7:
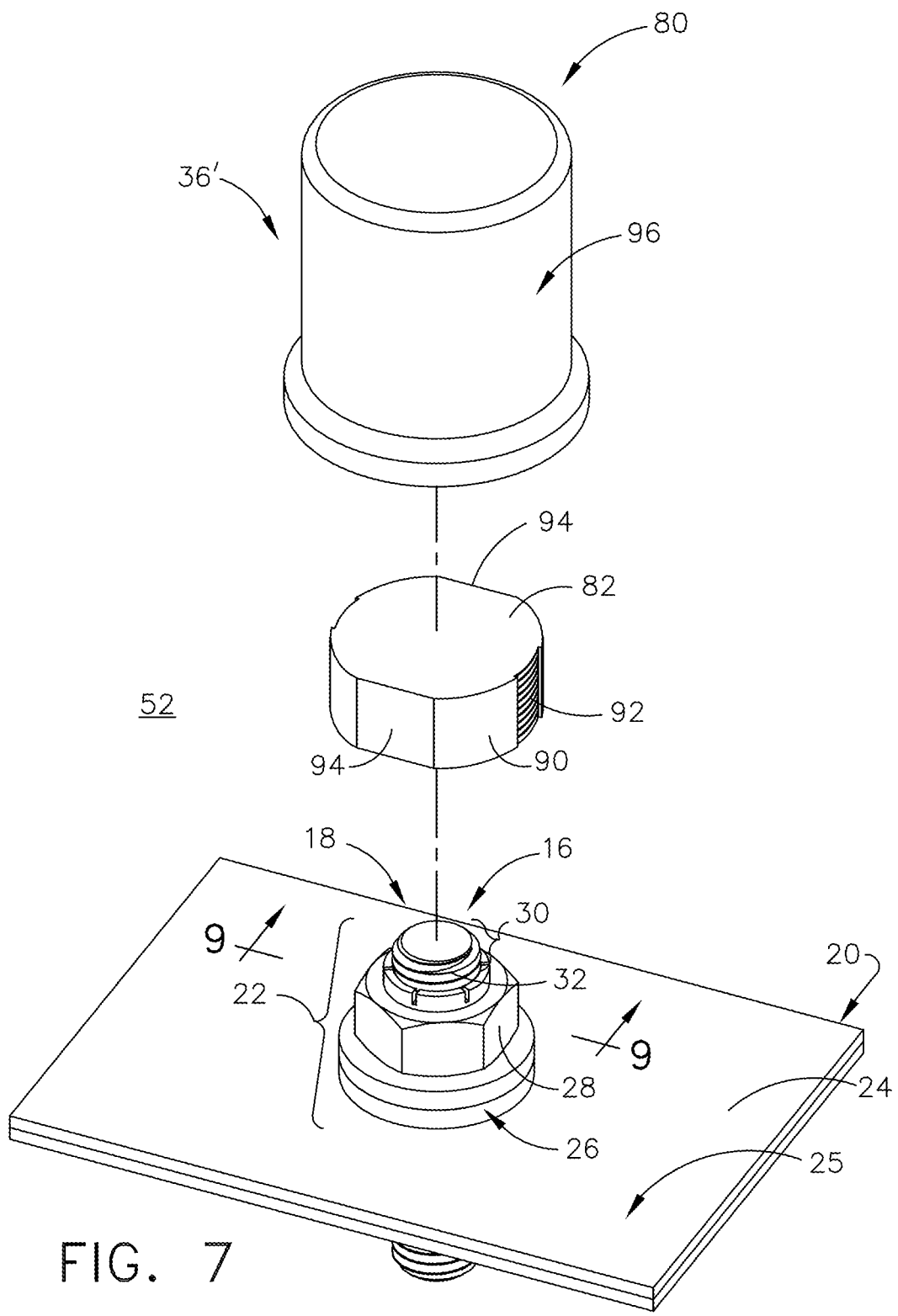
FIG. 7 is an exploded view of a second embodiment of the cap assembly for providing EME/lightning strike event protection with respect to an end portion of the metallic bolt assembly as seen in FIG. 2.
Figure 8:
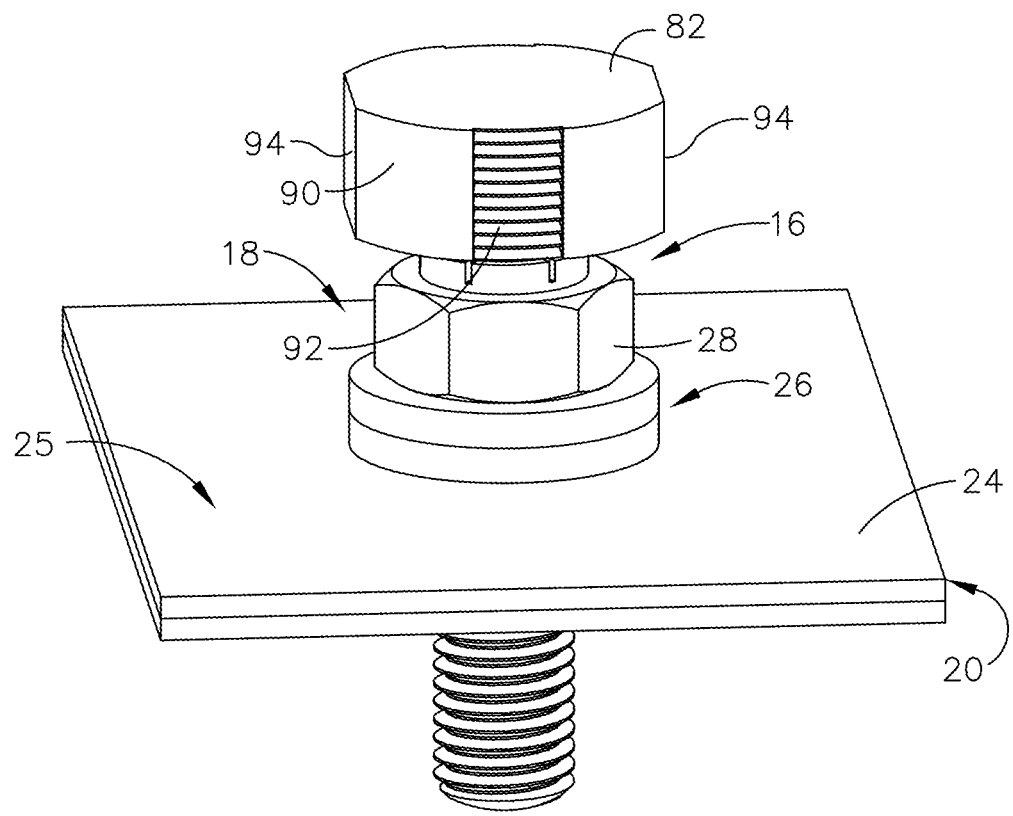
FIG. 8 is a perspective view of a first cap member of the second embodiment of the cap assembly of FIG. 7 secured to a threaded portion of a threaded shaft which extends from a nut of the metallic bolt fastener assembly.
Figure 9:
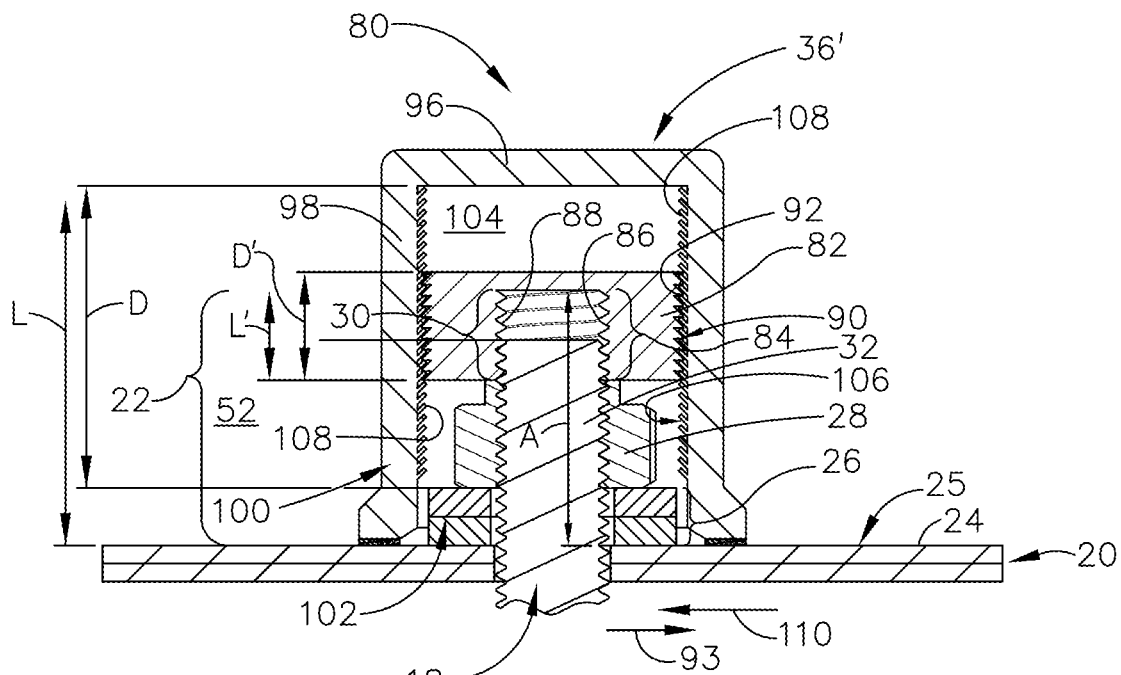
FIG. 9 is a cross section view of the second embodiment of the assembled cap assembly secured to the metallic bolt fastener of FIG. 7 as seen along line 9-9.
Figure 10:
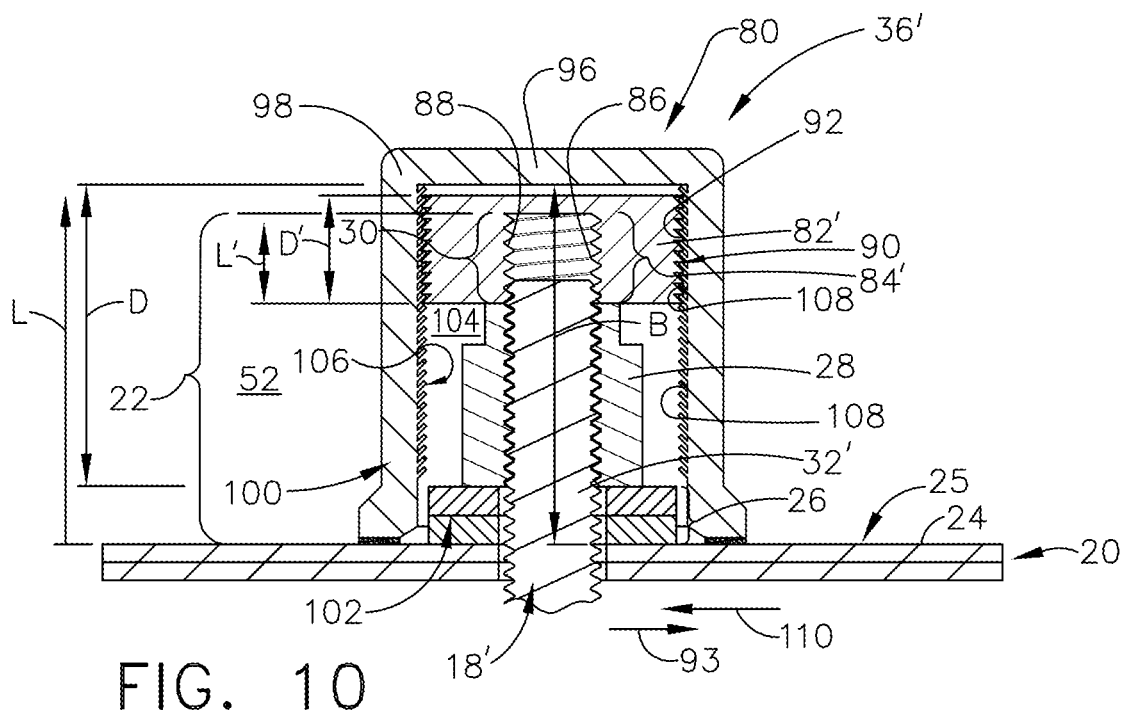
FIG. 10 is the cross section view of FIG. 9 wherein the second embodiment of the cap assembly is secured to the end portion of the metallic bolt assembly with the diameter of the threaded shaft having a smaller diameter and with the an end portion of the metallic bolt assembly extending a greater distance from a surface of the structural assembly being secured than what is shown in FIG. 9.

In referring to FIGS. 7-12, second embodiment 80 of cap assembly 36' for electrically isolating end portion 22 of metallic bolt assembly 18 and 18' is shown. Cap assembly 36', as will be discussed herein, is used to enclose end portion 22 of metallic bolt assembly 18, as seen in FIGS. 7-9, within cap assembly 36' wherein cap assembly 36' is positioned over end portion 22 and is, in this example, sealed against surface 24. First cap member 82 includes bore 84 which extends through at least a portion of first cap member 82 and surface 86 of first cap member 82 positioned within bore 84 defines first threads 88 wherein diameter of bore 84 and first threads 88 accommodate diameter of threaded shaft 32. External surface 90 defines first teeth 92 which extend in direction 93, in this example, away from first cap member 82 and which are positioned along length L' of external surface 90 of first cap member 82. In FIG. 10, first cap member 82' includes bore 84' which extends through at least a portion of first cap member 84', wherein bore 84' has a smaller diameter than the diameter of bore 84, and first threads 88 within first cap member 84' accommodate a smaller diameter of threaded shaft 32' of metallic bolt assembly 18'. At the same time, both first cap member 82 as seen in FIG. 9 and first cap member 82' as seen in FIG. 10 both have external surface 90 which defines first teeth 92 and engage second teeth 108 of second cap 96, as seen in FIGS. 9 and 10 and will be discussed in further detail with respect to FIGS. 11 and 12. These configurations of first cap members 82 and 82' have different bore sizes of bore 84 and 84' respectively and have the same external size and configuration. This arrangement permits the utilization of same second cap 96 regardless of the change in diameter of threaded shafts 32 or 32' being present. Further versatility of cap assembly 36' will be discussed below with respect to second cap member 96 accommodating different lengths of end portions 22 of metallic bolt assemblies 18 and 18' extending from surface 24.

First cap member 82 or 82' is constructed of one of a thermoplastic, thermoset or metallic material. Other non-conductive materials can be employed and other conductive materials can also be employed since first cap member 82 or 82' will be enclosed within second cap member 96 and will not be exposed to environment 52 in the vicinity of metallic bolt assembly 18 or 18'. In addition, in this example, first cap member 82 includes a pair of wrench flats 94, as seen for example for first cap member 82 in FIG. 8, positioned on external surface 90 of first cap member 82. This configuration for first cap member 82 is similar to that of first cap member 82' (not shown). Pair of wrench flats 94 are positioned spaced apart from one another along external surface 90 of first cap member 82. Any number of spaced apart wrench flats can be employed on external surface 90 so as to provide the installer ease of application of torque to first cap member 82 during installation but yet at the same time not to compromise the integrity of the use of first teeth 92 positioned on external surface 90 of first cap member 82. The arrangement with respect to pair of wrench flats 94 with respect to first cap member 82, as discussed above, applies to that of first cap member 82' as well and is not shown.

In installing first cap member 82, of FIGS. 7-9, first threads 88 of first cap member 82 engage threaded portion 30 of threaded shaft 32 of metallic bolt assembly 18. First threads 88 engage in a range of one thread up to and including three threads of the threaded portion 30 of threaded shaft 32 of metallic bolt assembly 18. With first cap member 82 secured to threaded portion 30, in this example, first cap member 38 abuts nut 28 positioned on threaded portion 30 of threaded shaft 32 of metallic bolt assembly 18. Similarly, in installing first cap member 82' of FIG. 10, first threads 88 of first cap member 82' engage threaded portion 30 of threaded shaft 32' of metallic bolt assembly 18'. First threads 88 engage, as stated above, in a range of one thread up to and including three threads of threaded portion 30 of threaded shaft 32' of metallic bolt assembly 18'. With first cap member 82' secured to threaded portion 30, in this example, first cap member 82' abuts nut 28 positioned on threaded portion 30 of threaded shaft 32' of metallic bolt assembly 18'.

In referring to FIGS. 9 and 10 second cap member 96 includes sidewall 98, as seen in FIGS. 9 and 10, which defines receptacle 100 with opening 102 providing access for first cap member 82 to be positioned within interior 104 of receptacle 100. Sidewall 98 of receptacle 100 includes interior surface 106 which defines second teeth 108 which extend in direction 110, in this example, away from sidewall 98 toward interior 104 of receptacle 100 and extends along length L of interior surface 106. In referring to FIGS. 9 and 10, second teeth 108 extend along length L of interior surface 106 of receptacle 100 first distance D and first teeth 92 extend along length L' of external surface 90 of first cap member 82 second distance D'. First distance D is greater than second distance D'.

As mentioned above, second teeth 108 are positioned along length L of interior surface 106 of receptacle 100 of second cap member 96 extending first distance D. First teeth 92 are positioned along length L' of external surface 90 of first cap member 82 extending second distance D' wherein first distance D is greater than second distance D'. This greater distance of first distance D in which second teeth 108 extends, allows first teeth 92 of external surface 90 of first cap member 82 to travel along second teeth 108 so as to adjust to differing distances in which end portions 22 of different metallic bolt assemblies may extend from surface 24 of structural components 20 such that second cap member 96 encloses end portion 22 of metallic bolt assembly 18 with reaching surface 24. This versatility of cap assembly 36', for example, can be seen in FIGS. 9 and 10. In FIG. 9, end portion 22 of metallic bolt assembly 18 extends to altitude A above surface 24 which is lower than end portion 22 of metallic bolt assembly 18' in FIG. 10 which extends to a higher altitude B above surface 24. Thus in FIG. 9, with first cap member 82 secured to threaded portion 30, first cap member 82 with first teeth 92, travels sufficiently high enough within receptacle 100 along second teeth 108 such that receptacle 100 reaches surface 24. In FIG. 10 with first cap member 82' secured to threaded portion 30, first cap member 82' travels sufficiently high enough within receptacle 100 along second teeth 108 until receptacle 100 reaches surface 24. As seen in FIGS. 9 and 10, based on the ability of first teeth 92 being able to travel along second teeth 108 until sidewall 98 of receptacle 100 reaches surface 24, end portion 22 of metallic bolt assembly 18 and 18' in FIGS. 9 and 10, respectively, which extend to different altitudes from surface 24, can be enclosed within cap assembly 36' with sidewalls 98 of receptacle 100 extending to surface 24. This versatility provided by the difference in distance D of second teeth 108 extending along length L of interior surface 106 of receptacle 100 being greater than distance D' of first teeth 92 extending along length L' of external surface 90, provides second cap member 96 of cap assembly 36' the ability to securely enclose various lengths of end portions 22 extending from surface 24 and reduces the number of different sized receptacles 100 needed in fabricating a complex structure such as aircraft 10.

Second cap member 96 is constructed of various select compositions such as thermoplastic or thermoset materials. In these examples, the composition(s) is non-conductive which facilitates the electrical isolation of end portion 22 of metallic bolt assembly 18 or 18'. Second cap member 96 is pushed down over first cap member 82 or 82' with first and second teeth 92, 108 passing by one another, as will be described below, and locking second cap member 96 to first cap member 82 or 82' and with receptacle 100 reaching surface 24.

Figure 11:
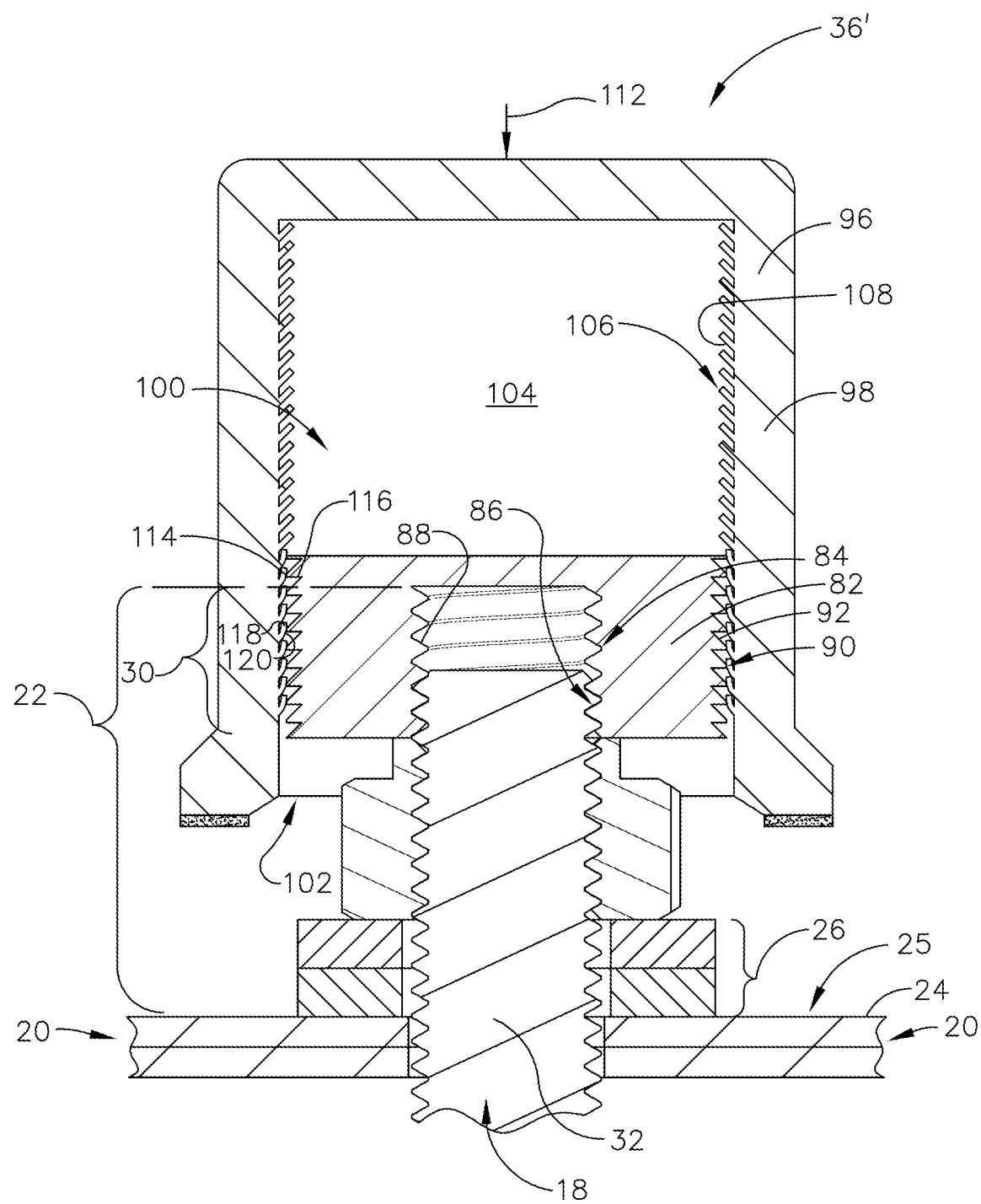
FIG. 11 is a cross section view along line 9-9 of FIG. 7 showing the insertion of first cap member of the second embodiment of the cap assembly into the second cap member in the process of securing and enclosing the end portion of the metallic bolt assembly with the second embodiment of cap assembly.
Figure 12:
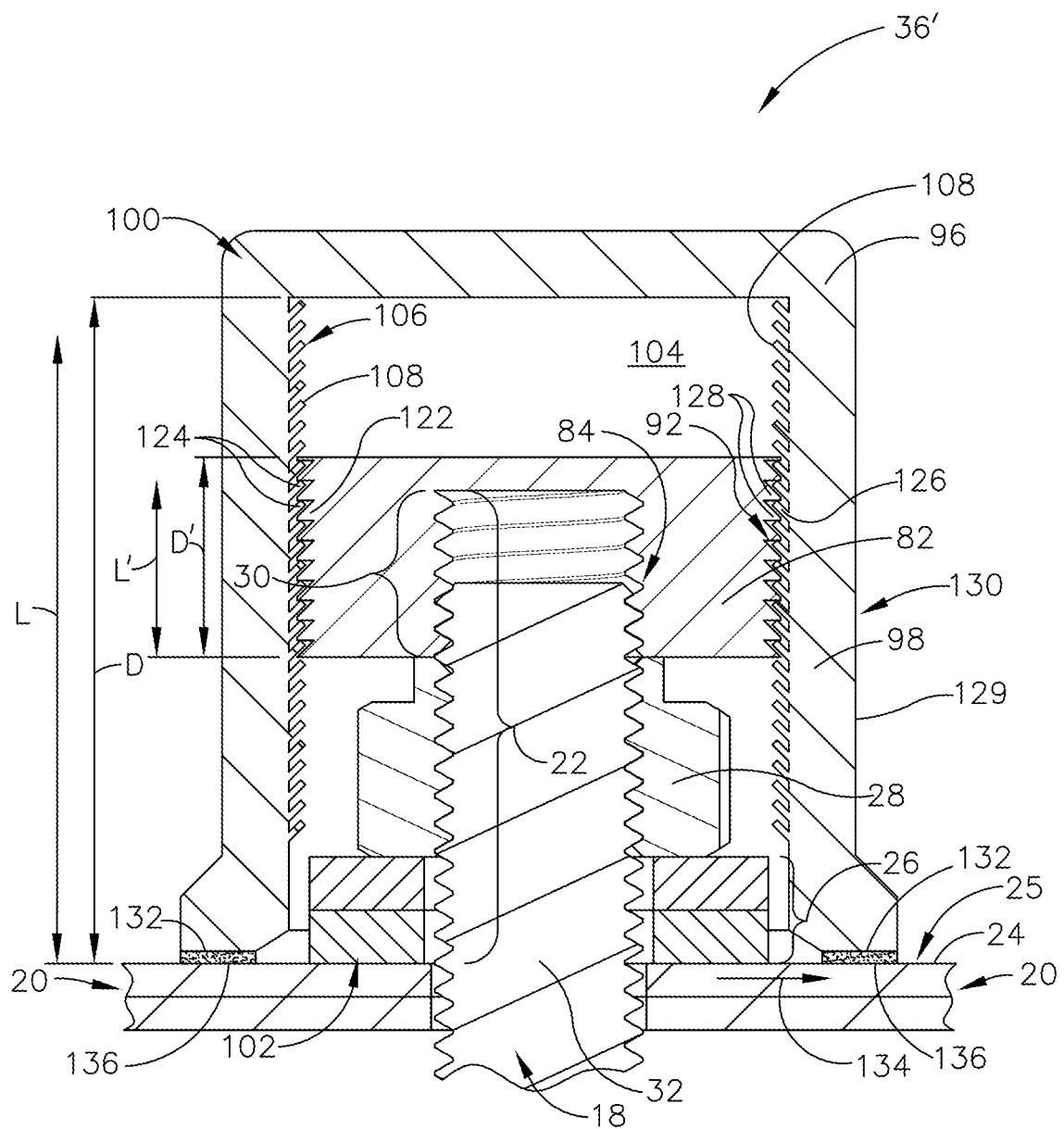
FIG. 12 is the cross section view of FIG. 11 of the second embodiment of the cap assembly installed with the second cap member in a locked position with respect to the first cap member electrically isolating the end portion of the metallic bolt assembly.

In referring to FIG. 11, second cap member 96 of cap assembly 36' is pushed in direction 112 over first cap member 82 toward surface 24. As seen in FIG. 12, second cap member 96 has reached the destination of surface 24 and in this example each of first teeth 92 is positioned between an adjacent pair of second teeth 108 and similarly each of the second teeth 108 is positioned between an adjacent pair of first teeth 92. Interleaving of first and second teeth 92, 108 locks second cap member 96 to first cap member 82. The example shown for installation of cap assembly 36', as seen in FIGS. 11-12, utilizes first cap member 82 as seen in FIGS. 7-9. The installation of cap assembly 36' which utilizes first cap assembly 82' is similarly installed as first cap member 82.

In referring to FIG. 11, insertion of first cap member 82 into interior 104 of receptacle 100, an end portion 114 of one tooth 116 of first teeth 92 comes into contact with an end portion 118 of one tooth 120 of second teeth 108 such that at least one of: end portion 114 of the one tooth 116 of the first teeth 92 or end portion 118 of one tooth 120 of second teeth 108 flex permitting one tooth 116 of first teeth 92 and one tooth 120 of second teeth 108 to move past one another. In the example shown in FIG. 11, one tooth 116 of first teeth 92 are constructed such that end portion 118 of one tooth 120 of second teeth 108 flexes relative to one tooth 116 of first teeth 92. In other constructions (not shown), end portion 114 of one tooth 116 of first teeth 92 will flex when one tooth 120 of second teeth 108 comes into contact with end portion 114. Also (not shown) is a configuration wherein both end portions 114 and 118 flex when one tooth 116 of first teeth 92 and one tooth 120 of second teeth 108 come into contact with one another.

In referring to FIG. 12, with having pushed second cap member 96 over first cap member 82, such that receptacle 100 reaches surface 24, first cap member 82 and end portion 22 of metallic bolt assembly 18 are positioned within interior 104 of receptacle 100. At least one tooth 122 of first teeth 92 is positioned between two adjacent teeth 124 of second teeth 108 or one tooth 126 of second teeth 108 is positioned between two adjacent teeth 128 of first teeth 92. With second cap member 96 having been pushed over first cap member 82 in this fashion, first and second cap members 82, 96 are in locked position with respect to one another.

In referring to FIG. 12, a portion of an external surface 129 of the receptacle 100 includes cylindrical shape 130 which includes end surface 132 which extends in an angular direction 134 relative to length L of interior surface 106 of receptacle 100. In this example angular direction 134 is transverse to length L. With second cap member 96 in locked position over first cap member 82 further electrical isolation of end portion 22 of metallic bolt assembly 18 is achieved with sealant or adhesive 136, as similarly described earlier for sealant or adhesive 78, positioned on end surface 132 prior to completion of pushing second cap member 96 against surface 24 positioning sealant or adhesive 136 between end surface 132 and surface 24.

Figure 13:
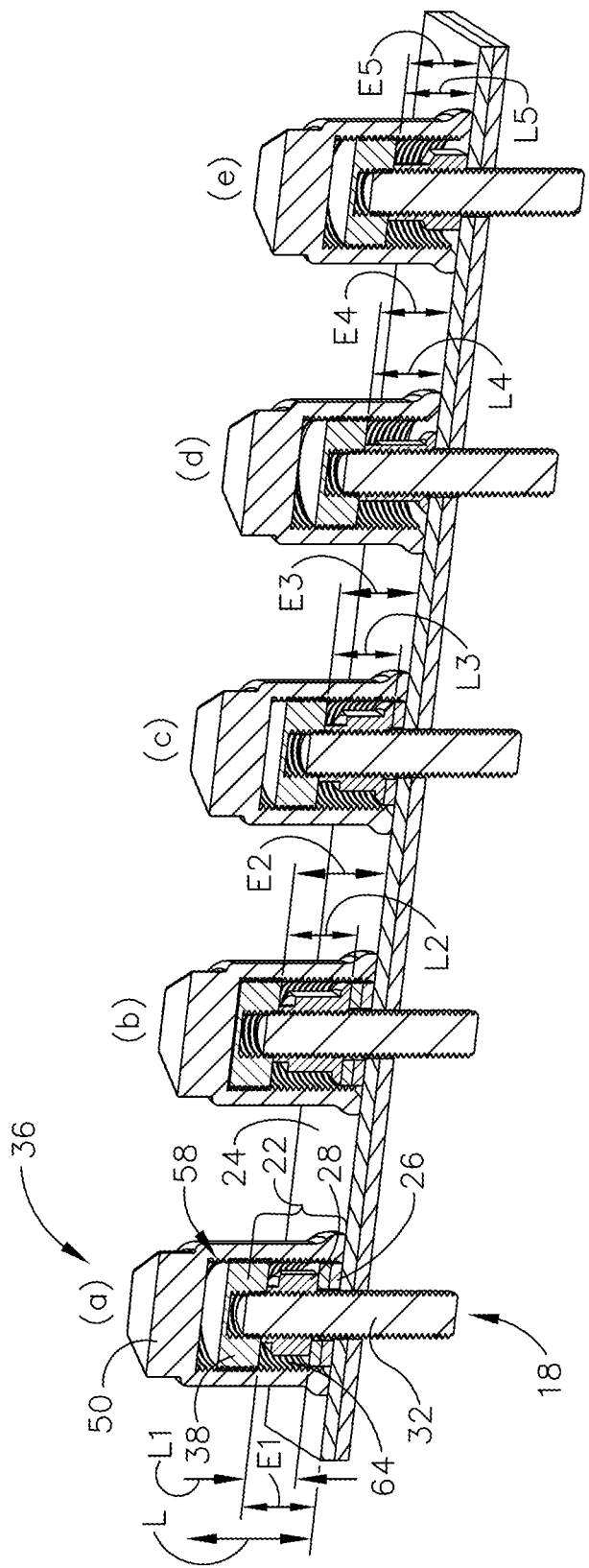
FIG. 13 is a cross section view as taken along line 5-5 in FIG. 3 of first embodiment of the assembled cap assembly secured to and enclosing variably configured end portions of metallic bolt assemblies.

In referring to FIG. 13, examples of first embodiment of cap assemblies 36 designated as (a)-(e) are shown which accommodate different configurations and/or sizes of end portions 22 of metallic bolt assembly 18 as generally seen for example in FIG. 5. First cap member 38 can result in being positioned in different locations within second cap member 50 along length L of interior surface 62 of receptacle 58 depending on the number of washers 26 employed, a length of nut 28 employed and a length of threaded shaft 32 which extends from surface 24 from which end portion 22 extends. Examples of variations in the size and/or configurations of end portion 22 and how that impacts in the resulting location of first cap member 38 within second cap member 50 with second cap member 50 enclosing end portion 22 of metallic bolt assembly 18, can be seen by way of examples (a)-(e) in FIG. 13 for first embodiment of cap assembly 36.

In example (a) end portion 22 of metallic bolt assembly 18 includes two washers 26 and nut 28 of a first length L1 positioning engaged first cap member 38 abutting nut 28 at a first elevation E1 above surface 24 within second cap member 50. Refer to example (a) for reference to part designations for remainder of examples (b)-(e). In example (b) end portion 22 of metallic bolt assembly 18 includes two washers 26 and nut 28 of a second length L2 positioning engaged first cap member 38 abutting nut 28 at a second elevation E2 above surface 24 within second cap member 50. In example (c) end portion 22 of metallic bolt assembly 18 includes one washer 26 and nut 28 of a third length L3 positioning engaged first cap member 38 abutting nut 28 at a third elevation E3 above surface 24 within second cap member 50. In example (d) end portion 22 of metallic bolt assembly 18 includes no washers and nut 28 of a fourth length L4 positioning engaged first cap member 38 abutting nut 28 at a fourth elevation E4 above surface 24 within second cap member 50. In example (e) end portion 22 of metallic bolt assembly 18 includes no washers and nut 28 of a fifth length L5 positioning engaged first cap member 38 abutting nut 28 at a fifth elevation E5 above surface 24 within second cap member 50.

These various configurations and sized lengths of end portions 22 as well as others can be accommodated by cap assembly 36 which utilizes a single sized second cap member 50 and a single sized first cap member 38. It should be understood that with a change in diameter of threaded shaft 32 for example as shown in FIG. 6 as threaded shaft 32', first cap member 38' with an accommodating sized bore 40', as seen in FIG. 6 can be employed with cap assembly 36 thereby accommodating a different diameter or sized threaded shaft 32' and with first cap member 38' having the same external size and configuration as that of first cap member 38 the same second cap member 50 can be employed as earlier described. This configuration of cap assembly 36 provides enclosure for a wide range of sizes and configurations of end portions 22 of metallic bolt assemblies 18 without needing a wide range of sizes for either first cap member 38 or second cap member 50.

Figure 14:
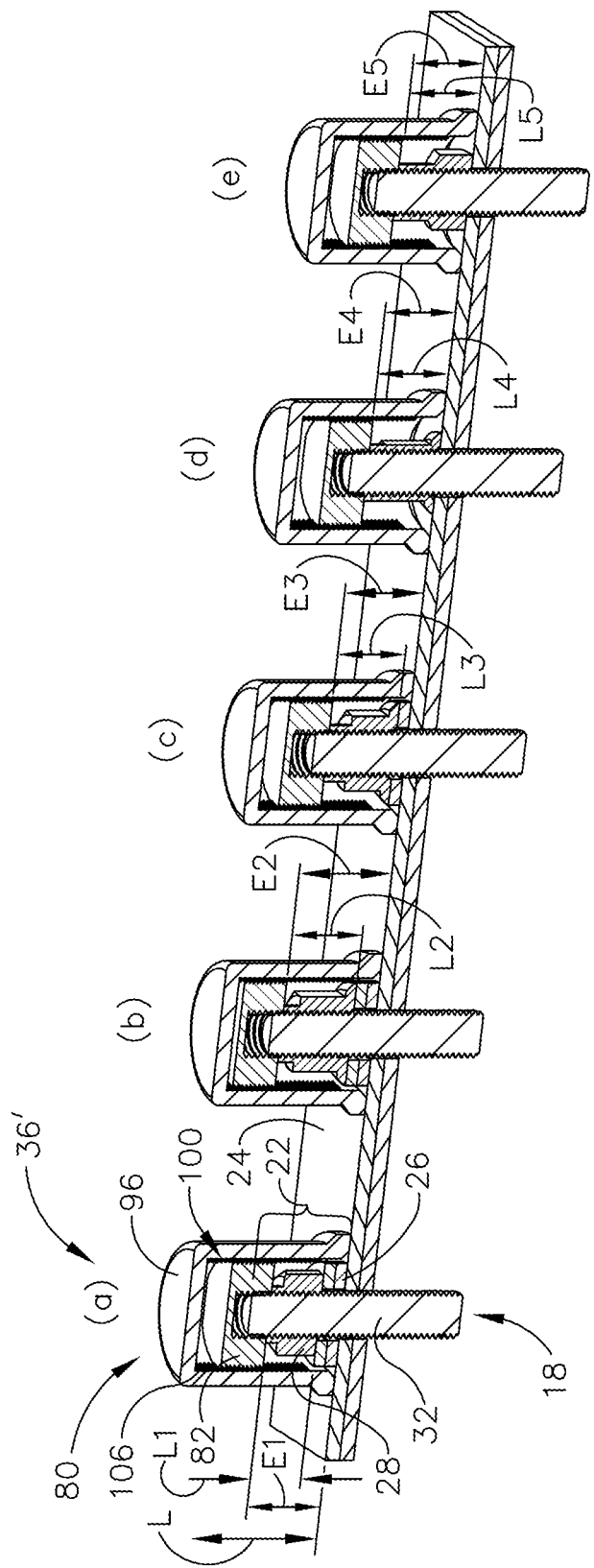
FIG. 14 is a cross section view as taken along line 9-9 in FIG. 7 of second embodiment of the assembled cap assembly secured to and enclosing variably configured end portions of metallic bolt assemblies.

In referring to FIG. 14, examples of second embodiment 80 of cap assemblies 36' designated as (a)-(e) are shown which accommodate different configurations and/or sizes of end portions 22 of metallic bolt assembly 18 as generally seen for example in FIG. 9. First cap member 82 can result in being positioned in different locations within second cap member 96 along length L of interior surface 106 of receptacle 100 depending on the number of washers 26 employed, a length of nut 28 employed and a length of threaded shaft 32 which extends from surface 24 from which end portion 22 extends. Examples of variations in the size and/or configurations of end portion 22 and how that impacts in the resulting location of first cap member 82 within second cap member 96 with second cap member 96 enclosing end portion 22 of metallic bolt assembly 18, can be seen by way of examples (a)-(e) in FIG. 13 for second embodiment 80 of cap assembly 36'.

In example (a) end portion 22 of metallic bolt assembly 18 includes two washers 26 and nut 28 of a first length L1 positioning engaged first cap member 82 abutting nut 28 at a first elevation E1 above surface 24 within second cap member 96. Refer to example (a) for reference to part designations for remainder of examples (b)-(e). In example (b) end portion 22 of metallic bolt assembly 18 includes two washers 26 and nut 28 of a second length L2 positioning engaged first cap member 82 abutting nut 28 at a second elevation E2 above surface 24 within second cap member 96. In example (c) end portion 22 of metallic bolt assembly 18 includes one washer 26 and nut 28 of a third length L3 positioning engaged first cap member 82 abutting nut 28 at a third elevation E3 above surface 24 within second cap member 96. In example (d) end portion 22 of metallic bolt assembly 18 includes no washers and nut 28 of a fourth length L4 positioning engaged first cap member 82 abutting nut 28 at a fourth elevation E4 above surface 24 within second cap member 96. In example (e) end portion 22 of metallic bolt assembly 18 includes no washers and nut 28 of a fifth length L5 positioning engaged first cap member 82 abutting nut 28 at a fifth elevation E5 above surface 24 within second cap member 96.

These various configurations and sized lengths of end portions 22 as well as others can be accommodated by cap assembly 36' which utilizes a single sized second cap member 96 and a single sized first cap member 96. It should be understood that with a change in diameter of threaded shaft 32 for example as shown in FIG. 10, as threaded shaft 32', first cap member 82' with an accommodating sized bore 84', as seen in FIG. 10, can be employed with cap assembly 36' thereby accommodating a different diameter or sized threaded shaft 32' and with first cap member 82' having the same external size and configuration as that of first cap member 82 the same second cap member 96 can be employed as earlier described. This configuration of cap assembly 36' provides enclosure for a wide range of sizes and configurations of end portions 22 of metallic bolt assemblies 18 without needing a wide range of sizes for either first cap member 82 or second cap member 96.

While various embodiments have been described above, this disclosure is not intended to be limited thereto. Variations can be made to the disclosed embodiments that are still within the scope of the appended claims.

What is claimed:

1. A cap assembly for enclosing an end portion of a metallic bolt assembly, comprising:
   a first cap member includes:
      a bore which extends through at least a portion of the first cap member and a surface of the first cap member positioned within the bore defines first threads; and
      an external surface defines second threads; and
   a second cap member includes:
      a sidewall which defines a receptacle with an opening which provides access for the first cap member to be positioned within an interior of the receptacle; and
      the sidewall of the receptacle includes an interior surface which defines third threads compatibly configured to engage the second threads of the external surface of the first cap member, wherein:
         the third threads are positioned along a length of the interior surface of the receptacle extending a first distance and the second threads are positioned along a length of the external surface of the first cap member extending a second distance;
         the first distance is greater than the second distance; and
         with the receptacle positioned on a surface, from which the end portion of the metallic bolt assembly extends, second cap assembly encloses and electrically isolates first cap assembly and the end portion of the metallic bolt assembly from an environment outside of the receptacle bounded by the surface and an external surface of the receptacle.

2. The cap assembly of claim 1, wherein the first cap member comprises one of a thermoplastic, thermoset or metallic material.

3. The cap assembly of claim 1, wherein the first cap member includes a pair of wrench flats positioned on the external surface of the first cap member.

4. The cap assembly of claim 3, wherein one of the pair of wrench flats is positioned spaced apart from another of the pair of wrench flats along the external surface of the first cap member with second threads extending between the pair of wrench flats.

5. The cap assembly of claim 1, with the first threads of the first cap member engaged to a threaded portion of threaded shaft of the metallic bolt assembly:
   the first threads engage in a range of one thread up to and including three threads of the threaded portion of threaded shaft of the metallic bolt assembly; and
   the first cap member abuts a nut positioned on the threaded shaft of the metallic bolt assembly.

6. The cap assembly of claim 1, wherein the second cap member comprises one of a thermoplastic or, thermoset material.

7. The cap assembly of claim 1, wherein the second cap member includes a pair of wrench flats positioned spaced apart from one another along an external surface of the second cap member.

8. The cap assembly of claim 1, wherein a portion of the external surface of the receptacle comprises a cylindrical shape which includes an end surface.

9. The cap assembly of claim 8, wherein the end surface which extends in an angular direction with respect to the length of the interior surface of the receptacle.

10. The cap assembly of claim 9, wherein one of a sealant or an adhesive is positioned on the end surface.

11. A cap assembly for enclosing an end portion of a metallic bolt assembly, comprising:
   a first cap member includes:
      a bore which extends through at least a portion of the first cap member and a surface of the first cap member within the bore defines first threads; and
      an external surface defines first teeth which extend in a direction away from the first cap member and which are positioned to extend along a length of the external surface; and
   a second cap member includes:
      a sidewall which defines a receptacle with an opening which provides access for the first cap member to be positioned within an interior of the receptacle; and
      the sidewall of the receptacle includes an interior surface which defines second teeth which extend in a direction away from the sidewall toward the interior of the receptacle and are positioned to extend along a length of the interior surface; wherein
         the second teeth extend along the length of the interior surface of the receptacle a first distance and the first teeth extend along the length of the external surface of the first cap member a second distance;
         the first distance is greater than the second distance; and
         with the receptacle positioned on a surface, from which the end portion of the metallic bolt assembly extends, second cap assembly encloses and electrically isolates first cap assembly and the end portion of the metallic bolt assembly from an environment outside of the receptacle bounded by the surface and by an external surface of the receptacle.

12. The cap assembly of claim 11, the first cap member comprises one of a thermoplastic, thermoset or metallic material.

13. The cap assembly of claim 11, wherein the first cap member includes a pair of wrench flats positioned on the external surface of the first cap member.

14. The cap assembly of claim 13, wherein the pair of wrench flats are positioned spaced apart from one another along the external surface of the first cap member.

15. The cap assembly of claim 11, with the first threads of the first cap member engaged to a threaded portion of a threaded shaft of the metallic bolt assembly:
the first threads engage in a range of one thread up to and including three threads of the threaded portion of the threaded shaft of the metallic bolt assembly; and
the first cap member abuts a nut positioned on the threaded shaft of the metallic bolt assembly.

16. The cap assembly of claim 11, wherein the second cap member comprises one of a thermoplastic or thermoset material.

17. The cap assembly of claim 11, with the insertion of the first cap member into the interior of the receptacle an end portion of one tooth of the first teeth comes into contact with an end portion of one tooth of second teeth such that at least one end portion of the one tooth of the first teeth or the end portion of the one tooth of the second teeth flex permitting the one tooth of the first teeth to move past the one tooth of the second teeth.

18. The cap assembly of claim 11, wherein with the first cap member positioned within the interior of the receptacle at least one of:
at least one tooth of the first teeth is positioned between two adjacent teeth of the second teeth, or
at least one tooth of the second teeth is positioned between two adjacent teeth of the first teeth.

19. The cap assembly of claim 11, wherein a portion of the external surface of the receptacle comprises a cylindrical shape which includes an end surface which extends in an angular direction relative to the length of the interior surface of the receptacle.

20. The cap assembly of claim 11, wherein one of a sealant or an adhesive is positioned on the end surface.

* * * * *